United States Patent [11] 3,601,450

| [72] | Inventor | Harold R. Baker |
|---|---|---|
| | | Lynwood, Calif. |
| [21] | Appl. No. | 819,683 |
| [22] | Filed | Apr. 28, 1969 |
| [45] | Patented | Aug. 24, 1971 |
| [73] | Assignee | Norris Industries, Inc. |
| | | Los Angeles, Calif. |

[54] VEHICLE WHEEL
4 Claims, 5 Drawing Figs.

[52] U.S. Cl...................................................... 301/63 R,
29/159.01, 219/80, 219/83
[51] Int. Cl...................................................... B60b 23/00
[50] Field of Search.......................................... 301/63;
29/159.01; 219/117, 80, 81, 82, 83

[56] References Cited
UNITED STATES PATENTS
2,205,251 6/1940 Gillette........................ 219/83

| 2,240,210 | 4/1941 | Dreyer.......................... | 219/83 X |
| 2,261,137 | 11/1941 | Broan............................ | 219/83 X |
| 2,840,422 | 6/1958 | Main.............................. | 301/63 |
| 3,143,377 | 8/1964 | Bulgrin.......................... | 301/63 |
| 3,432,207 | 3/1969 | Holmstrom.................... | 301/63 |

Primary Examiner—Richard J. Johnson
Attorney—Huebner & Worrel

ABSTRACT: A vehicle wheel and method of and apparatus for assembling wherein the wheel includes an annular rim and a spider inserted within the rim bridging the area defined by the rim. The spider is secured to the rim in a plurality of places by a series of overlapping seam welds. In assembling the wheel a method of utilizing opposed welding electrodes engaging the rim and spider, respectively, is employed, as well as apparatus for welding and moving the wheel to create an overlapping seam weld.

PATENTED AUG 24 1971 3,601,450
SHEET 1 OF 2
FIG. 1.
FIG. 2.
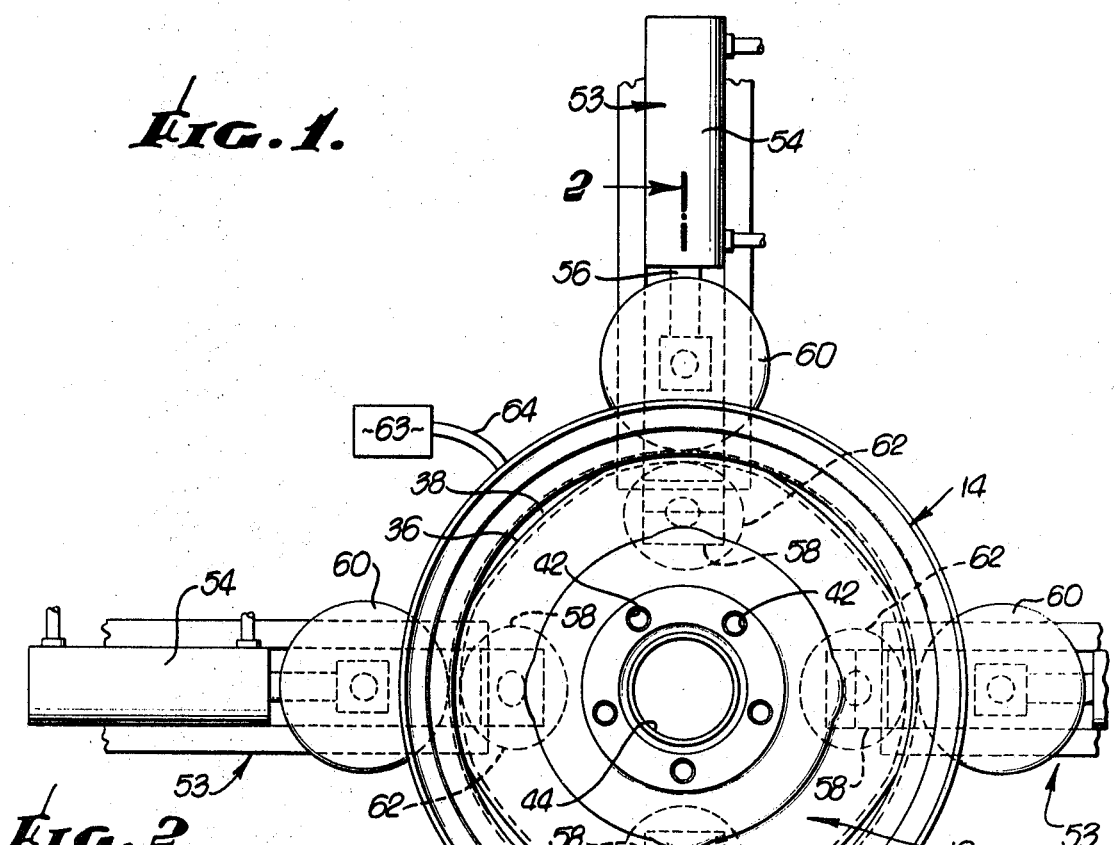
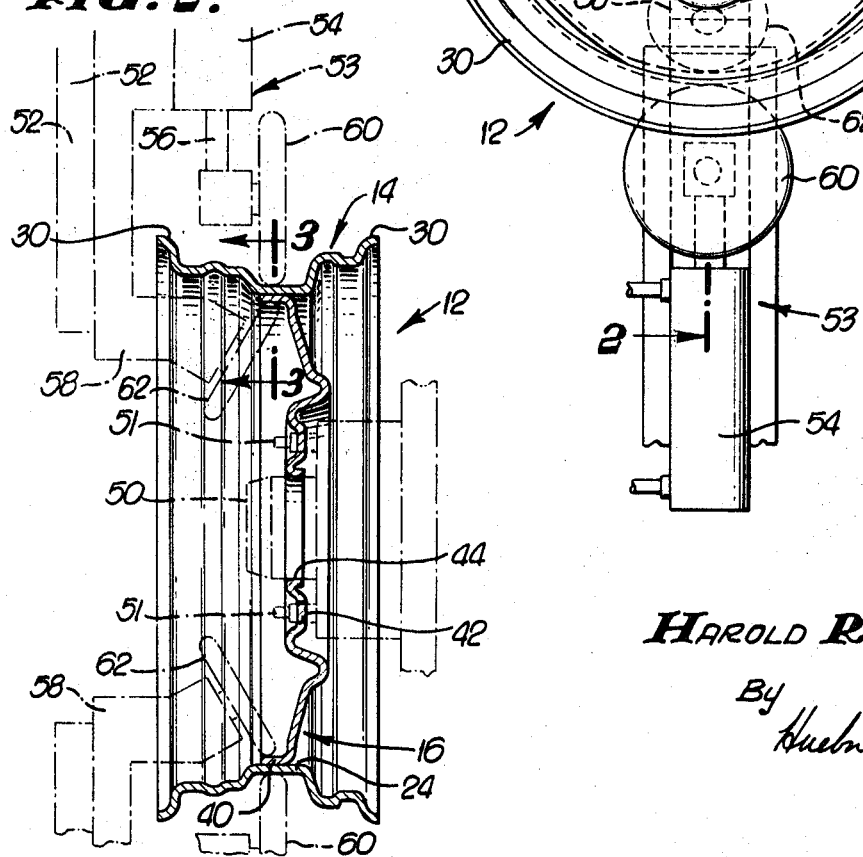
INVENTOR.
HAROLD R. BAKER
By
Huebner & Worrel
ATTORNEYS.

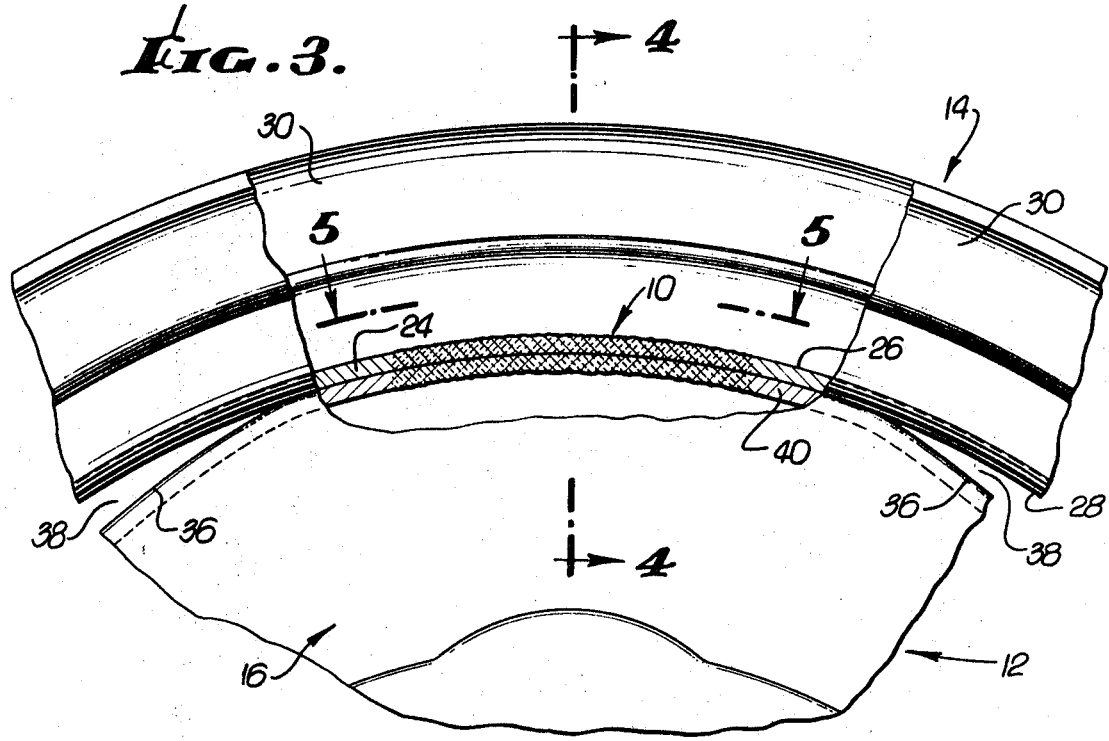
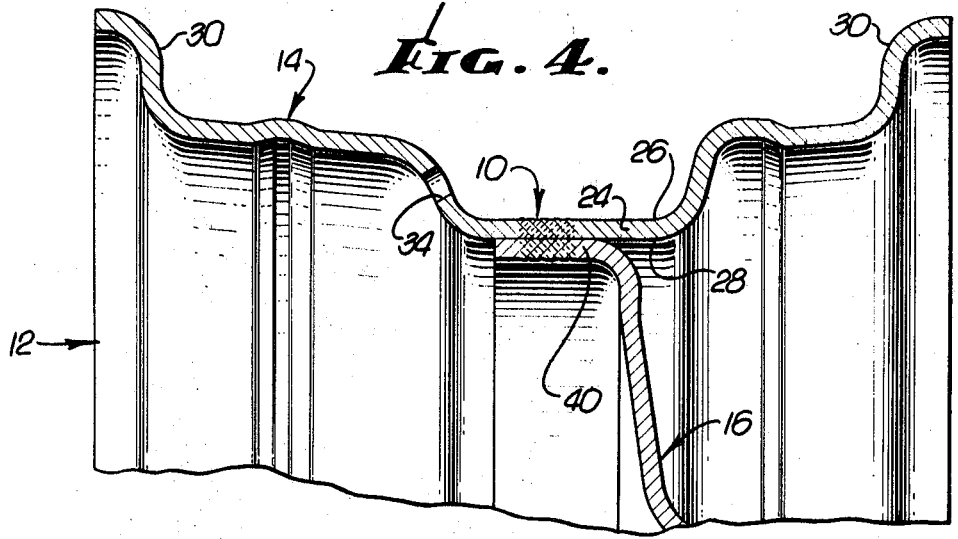
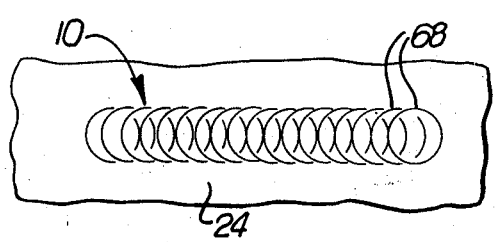

VEHICLE WHEEL

BACKGROUND OF THE INVENTION

Vehicle wheels generally are constructed of an annular rim which is rolled from flat stock into a desired cross section and approximate diameter, and the ends of the rim are welded, creating an endless, annular rim, Bridging the area defined by the rim is a spider or disc which is usually formed by a punch pressing operation. The spider is of a configuration which includes the usual wheel lug openings, hubcap retainers and center spindle-receiving opening.

Heretofore, the spider has been formed with an oversize diameter greater than the diameter of the rim by at least 0.050 inch, whereby the spider is press fitted into the rim. To assure securement of the spider to the rim, a relatively wide annular flange was provided which abutted the inside of the rim and was fastened thereto by any of the prior art means described below.

There are three such fastening means previously utilized. The first of a plurality of conventional rivets which extend through the rim and flange at four points around the circumference. The second fastening is accomplished by spot welding of the rim and flange in four areas around the circumference. The third prior art means is an arc weld at the end of the flange to the rim at four points around the circumference.

Each of the fastening means described above has had one common disadvantage in that constant rotation and vibration of the wheel, when mounted on the vehicle, has to some extent loosened the fasteners, and failure of the fastener under impact has occurred. This has been caused because the base metal breaks down under stress in the localized area of the welded fastener, and through fatigue of rivets in the other types of fastener. Such failure can cause the wheel to break apart, or at the very minimum, cause cracking of the rim, and air will be let out of the tire.

Additionally, all of the above-described fastening techniques have required that the annular flange be relatively wide so that the apparatus may engage enough metal to form the weld.

SUMMARY OF THE INVENTION

This invention is directed to the fastening means employed in securing an annular rim and a spider to form a conventional vehicle wheel. The securement consists of a series of overlapping seam welds of the rim and spider. It is preferred that four such series of overlapping seam welds be accomplished around the rim and spider.

The new fastening means for the rim and spider creates a vehicle wheel with greater strength to withstand failure than any of the other prior art devices.

Further, when the fastening means of this invention is employed, the width of the annular flange on the spider may be shortened.

The fastening is accomplished by a single or multiple stage electric welder which utilizes two electrodes adapted to engage the outer side of the rim and the inner side of the flange on the spider. In practice, a generally circular weld of approximately one-half inch in diameter is accomplished. Then the wheel is rotated approximately one-fourth inch, where another generally circular weld is performed so that there is an overlapping of the first weld. The process is continued until the desired length of the resultant seam weld is completed, preferably approximately 2½ inches in length.

The above-referred-to multiple stage electric welder, while employing old welding principles, is unique and new in that apparatus has been developed to simultaneously accomplish the fastening at four points around the wheel and to rotate the wheel.

One of the important advantages of the new fastening means is that the molecular structure of the parent metal in the wheel assembly in the area of the fastening is not unduly upset due to the fact that less heat is necessary to accomplish the fastening over prior art welding means. This will prevent a weakening of the metal in those areas and the tensile strength will remain relatively stable.

Further, by the utilization of the new fastening means, it is unnecessary to form the diameter of the spider with as large an overfit as heretofore necessary. This in turn will result in a truer wheel circumference, because there is less distortion of the rim when the spider is press fitted within the rim.

These and other advantages will become apparent from the following description and drawings wherein:

DESCRIPTION OF THE DRAWINGS

FIG. 1 is a top view schematic representation of the improved multiple stage resistance seam welder with a vehicle wheel positioned thereon being assembled with the new fastening technique;

FIG. 2 is a cross-sectional view taken on line 2—2 of FIG. 1, illustrating the wheel and the welder in phantom lines;

FIG. 3 is an enlarged fragmentary view of a vehicle wheel and one of the overlapping seam welds creating the fastening means, taken on line 3—3 of FIG. 2;

FIG. 4 is a cross-sectional view of a vehicle wheel taken on line 4—4 of FIG. 3; and FIG. 5 is a detailed view of an overlapping seam weld taken on line 5—5 of FIG. 3.

DETAILED DESCRIPTION OF PREFERRED EMBODIMENTS

This invention is directed to overlapping seam weld fastening means, generally designated 10, of the parts of a vehicle wheel designated 12, including an annular rim 14 and a spider or disc 16 both formed of a suitable metal. Further, the invention is directed to the method of assembling the vehicle wheel 12 by resistance seam welding apparatus, generally designated 18.

In the manufacture of a vehicle wheel 12, it is customary to separately fabricate the annular rim 14 and spider or disc 16, and secure the two members together, creating the final vehicle wheel, which is adapted to receive a tire (not shown).

The fabrication of the rim 14 is accomplished by starting with flat stock, and through a series of conventional rolling steps, forming the stock to the approximate diameter, as well as to the desired cross-sectional configuration best seen in FIGS. 2 and 4. This cross-sectional configuration of the rim 14 includes an annular, generally flat in cross section, center base portion 24 having exterior and interior surfaces 26 and 28, respectively. From each side of the base portion 24, the rim, in cross section, extends outwardly and upwardly, terminating in annular tire-retaining marginal wall portions 30.

Once the rim 14 has been formed, the ends (unnumbered) are joined together and butt welded at 32. The weld is then trimmed on the inner and outer surfaces and the edges. An opening 34 may then be pierced in the rim to receive a tire or tube valve stem (not shown).

The spider or disc 16 is fabricated, preferably from flat stock, by being punch pressed to the desired configuration.

There are generally two types of spiders used in creating a vehicle wheel. The first type is a solid spider which is circular around its entire circumference, and adapted to uninterruptedly contact the interior of the rim 12. The other type illustrated is known as an "arch opening or chain slot" spider. In such a construction, the spider is circular in circumference, but a plurality of chord bends 36 are made, normal to the circumference, so that when assembled with the rim 12, openings 38 are formed therebetween.

The spider or disc 16 is formed with an annular flange 40 extending normal to the diametrical plane thereof. Additionally, the spider or disc 16 is provided with a plurality of lug bolt openings 42, and a central opening 44, to be seated on the spindle (not shown) of a brakedrum and axle of a vehicle.

The cross-sectional configuration of the spider of disc 16, best seen in FIG. 2, may vary, depending on what type of vehicle the wheel is to be used on.

It is important to note that it is common practice in the industry, when forming spiders or discs, that the exterior diameter of the spider or disc flange is oversized from the interior of a rim base 24 by approximately 0.050 inch, so that a tight press fit is assured between the two parts forming the wheel. Such oversize was necessary to assure a tight press fit should the fastening means fail. In some cases the oversize needs to be increased to 0.1000 inch, depending on spider configurations.

With this amount of oversize, it was customary to knock the rim out of true circumferential roundness when the spider was pressed into place. Such distortion can decrease the safety of the wheel when rotating at an excessive r.p.m. on a vehicle.

However, in the present invention, because of the tested stability of vehicle wheels utilizing the new fastening means, the oversize diameter of the spider flange need be no more than 0.025 inch, that is, just enough to hold the parts together during the fastening operation. Of more importance is the fact that with less of an oversize, the press fitting of the spider or disc into the rim will not distort the true circumference of the rim, thus, creating greater safety.

Once the spider or disc 16 has been press fitted within the rim 14, the permanent fastening means of the overlapping seam weld 10 is accomplished at preferably 90° intervals around the circumference of the wheel 12. The fastening takes place between the interior surface 28 of the rim 14 and the flange 40 by a series of the overlapping seam welds 10.

In order to accomplish the weld, various methods may be employed; however, it is preferred that the multiple stage resistance seam welding apparatus 18 be utilized. Generally, the apparatus includes a mandrel means 50 to receive the opening 44 of the wheel 12. The mandrel means 50 is further provided with position pins 51 adapted to engage lugbolt openings 42 of the wheel 12. The pins 51 will aid in the rotation of the wheel 12.

The multiple stage include fixed members 52, to which there are slidably mounted cylinder assemblies generally designated 53. The assemblies 53 include cylinder members 54, hydraulically or pneumatically operated, and pistons 56. Further, the assemblies include slidable yokes 58.

Journaled on the pistons 56 are outer electrode wheels 60, and inner electrode wheels 62 are angularly mounted and journaled on yokes 58. The outer electrode wheels 60 are adapted to strike the outer surface 26 of the center base of the rim 14. The inner electrode wheels 62 are adapted to engage the flange 40 of the spider on its underside.

In operation when the wheel 12 is in position, the cylinder means are activated by any suitable control means, and the pistons 56 advance the outer electrodes 60 against the rim 14. Once the rim 14 is engaged, the cylinder assemblies 53 will reverse, moving away from the wheel 12, and causing yokes 58 and inner electrode wheels 62 to move out and engage the flange 40. In other words the cylinder assemblies are self-compensating.

Additionally, a water source 63 may be provided whereby water will be pumped through hose 64, to flood the rim during welding operations and reduce the heat of the rim.

It is also preferred that the annular contact surface of the electrodes 60 and 62 be bowed outwardly in cross section to achieve a concentrated point contact with the rim and flange. Such construction also achieves a dissipation of heat from the contact point, which further assures a reduced disruption of the parent metal.

When a weld is desired to be made, the piston assemblies 53 are each actuated under considerable high pressure, and electrodes 60 and 62 are forced against the surface 26, pressing the flange 40 and the base 24 together. At this point, the electrode wheels 60 and 62 are energized by suitable means, and the resistance therebetween will fuse the parent metal of the rim 12 and flange 40 together, forming a circular single weld nugget 68 of approximately ½ inch in diameter.

The electrodes are deenergized, and the mandrel 50 will rotate the wheel 12 approximately one quarter inch, where the welding process is repeated and a second weld nugget 68 is formed, partially overlapping the first weld nugget 68. This process is repeated until the desired length of overlapping weld nuggets 68, creating the finished overlapping seam weld 10, is formed. In actual practice, it has been found that a seam weld of approximately 2½ inches, at 90° intervals, forms a sufficient fastening means.

When utilizing a process of seam welding with the apparatus just describe, it has been found that for each weld nugget 68, only two pulses of heat are necessary to accomplish the proper fusion of parent metal, as opposed to seven pulses of heat necessary when using the conventional single-spot welding technique.

It is necessary to apply only two pulses of heat because less area has to be welded at one time by the overlapping seam weld than in a spot weld. Therefore, the concentration of heat can be reduced. While there are more actual welds in the overlapping seam weld, each weld is smaller in width and length than a spot weld for vehicle wheels, thus less heat is necessary. Therefore, with less applied heat and a smaller area of each seam weld, the molecular structure of the parent metal surrounding the weld is not changed and metal fatigue is avoided. This end result is further possible because the actual touching part of the bowed electrode is relatively small, further assuring that heat will dissipate to the atmosphere and not upset the surrounding metal.

While a multiple-stage resistance seam-welding apparatus 18 has been described and is preferred, it should be realized that a single-stage unit working on one area of the wheel 12 at a time can be utilized and the fastening can be accomplished.

By way of establishing the strength and safety of the vehicle wheel 12 when the rim 14 and spider 16 are fastened by the overlapping seam weld, testing has been carried out on a "bull wheel tester."

The test procedure includes the random selection of a completed wheel 12 and fitting it with a tire. The wheel and tire are then mounted for rotation on a roller, and a powered roller or "bull wheel" engages the tire and rotates the tire and wheel at a speed of approximately 52 miles per hour, or approximately 600 r.p.m.

In tests of the new wheel 12, selected at random, the wheel has undergone testing up to 4,000,000 revolutions at its design test load without any failure of the wheel 12 in the area of the fastening means which hold the rim and spider together. On the other hand, when prior art spot-welded, or riveted vehicle wheels of the same design test load were tested on the same tester, failures by way of cracks in the parent material surrounding the securement means developed at 2,000,000, revolutions or less.

Thus, it can be seen that under actual testing conditions, the new vehicle wheel 12 exceeded the failure point of prior art wheels by double the number of revolutions, and did not fail even at that point in the testing.

Therefore, the overlapping seam weld, or fastening means, provides a safer and more effective vehicle wheel than heretofore possible. Further, the method and apparatus utilized in so forming the fastening means, is new and novel, which not only assures greater safety of the wheel by less disturbance of the parent metal while welding, but has the capability of forming the desired four fastening means simultaneously.

While I have herein shown and described my invention in what I have conceived to be the most practical and preferred embodiment, it is recognized that departures may be made therefrom, within the scope of my invention, which is not to be limited to the details disclosed herein, but is to be accorded the full scope of the claims so as to embrace any and all equivalent structure, devices, and methods.

What is claimed is;

1. A vehicle wheel including a rim and a spider formed of metal, the rim comprising an annular wall providing a base portion, the spider comprising a central plate section and peripheral laterally extending flange means, the flange means fitting in the base portion in surface-to-surface engagement, fastening means permanently joining said base portion and flange means, said fastening means including a plurality of circumferentially spaced seam welds, each of said seam welds including a series of overlapping individual low-heat pulse weld nuggets induced through electrical resistance, the parent metal of said base portion and said flange means adjacent said seam welds remaining substantially molecularly stable.

2. A vehicle wheel as defined in claim 1 wherein each of said seam welds ranges from 2 to 3 inches in weight.

3. A vehicle wheel as defined claim 1, wherein said flange means is of narrow width relative to the width of the base portion.

4. A vehicle wheel as defined in claim 1 wherein there are four seam welds spaced approximately 90° apart around the periphery of the base portion.

UNITED STATES PATENT OFFICE
CERTIFICATE OF CORRECTION

Patent No. 3,601,450    Dated August 24, 1971

Inventor(s) Harold R. Baker

It is certified that error appears in the above-identified patent and that said Letters Patent are hereby corrected as shown below:

Column 1, line 22, "of" should read -- is --.
Claim 2, line 8, "weight" should read -- length --.

Signed and sealed this 31st day of October 1972.

(SEAL)
Attest:

EDWARD M. FLETCHER, JR.         ROBERT GOTTSCHALK
Attesting Officer               Commissioner of Patents